Feb. 12, 1952   L. L. THOMPSON   2,585,701
MUD AND CHEMICAL MIXER
Filed Dec. 28, 1948   4 Sheets-Sheet 1
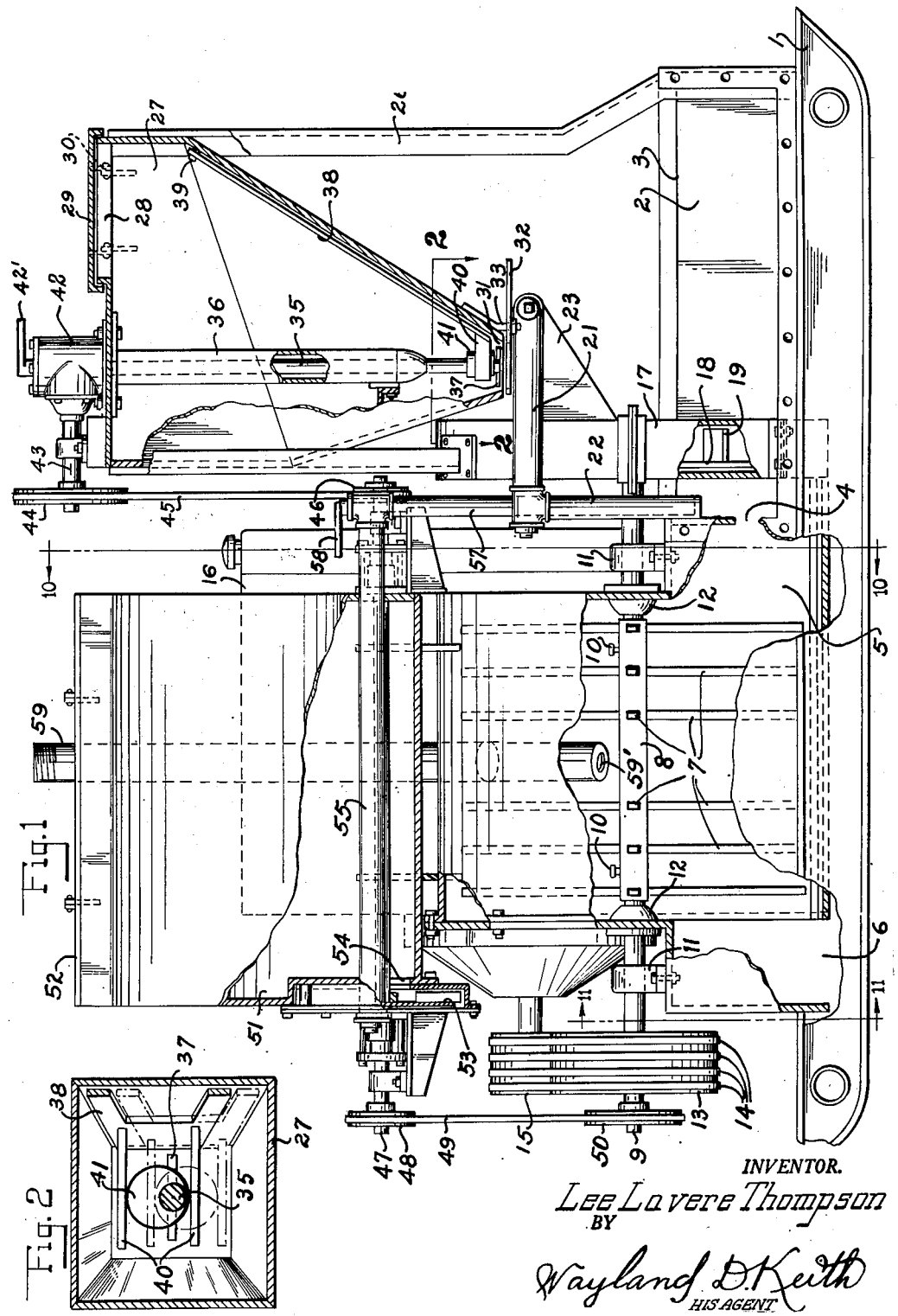
INVENTOR.
Lee Lavere Thompson
BY
Wayland D. Keith
HIS AGENT Feb. 12, 1952 L. L. THOMPSON 2,585,701
MUD AND CHEMICAL MIXER
Filed Dec. 28, 1948 4 Sheets-Sheet 2
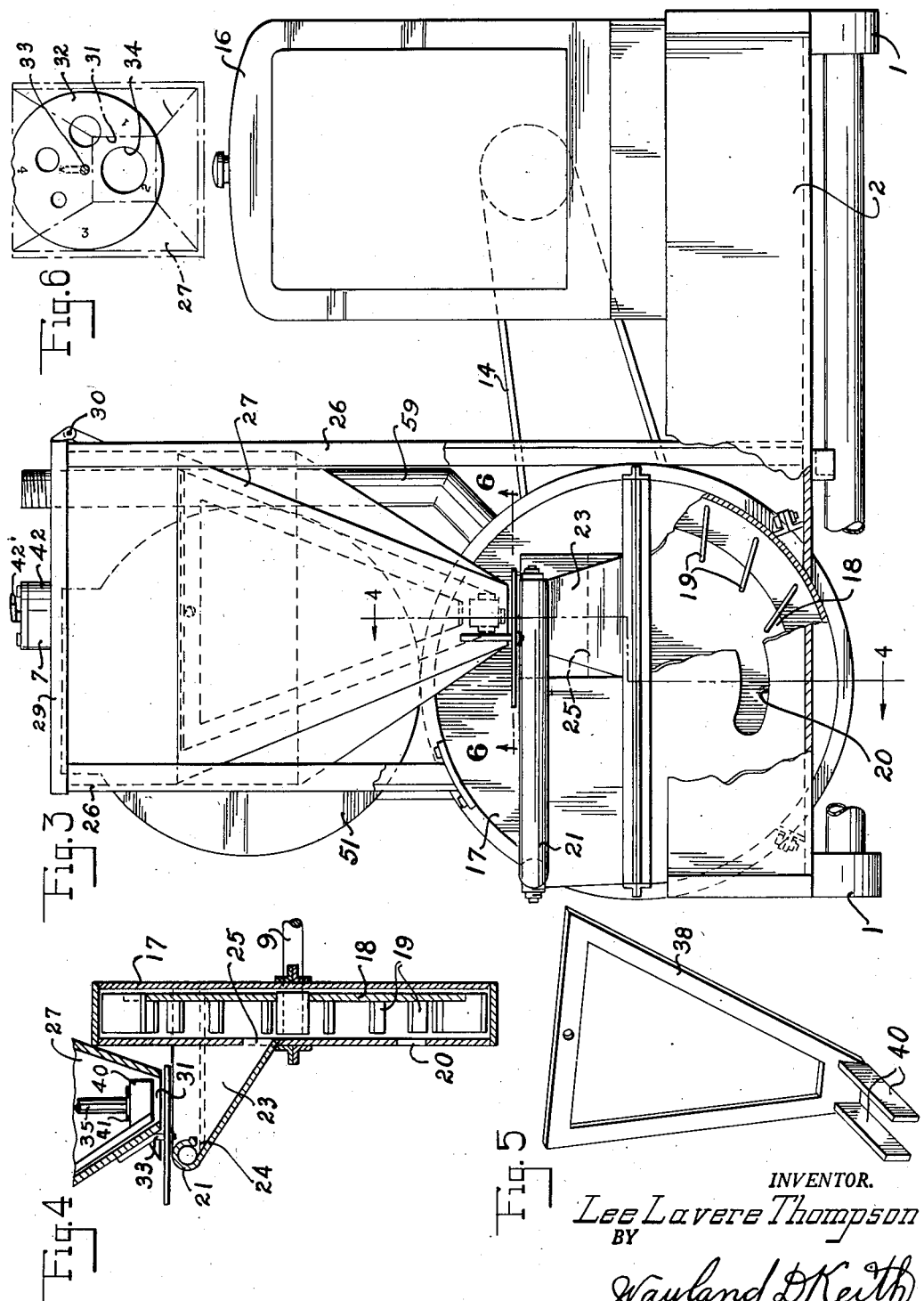
INVENTOR.
Lee Lavere Thompson
BY
Wayland D. Keith
HIS AGENT

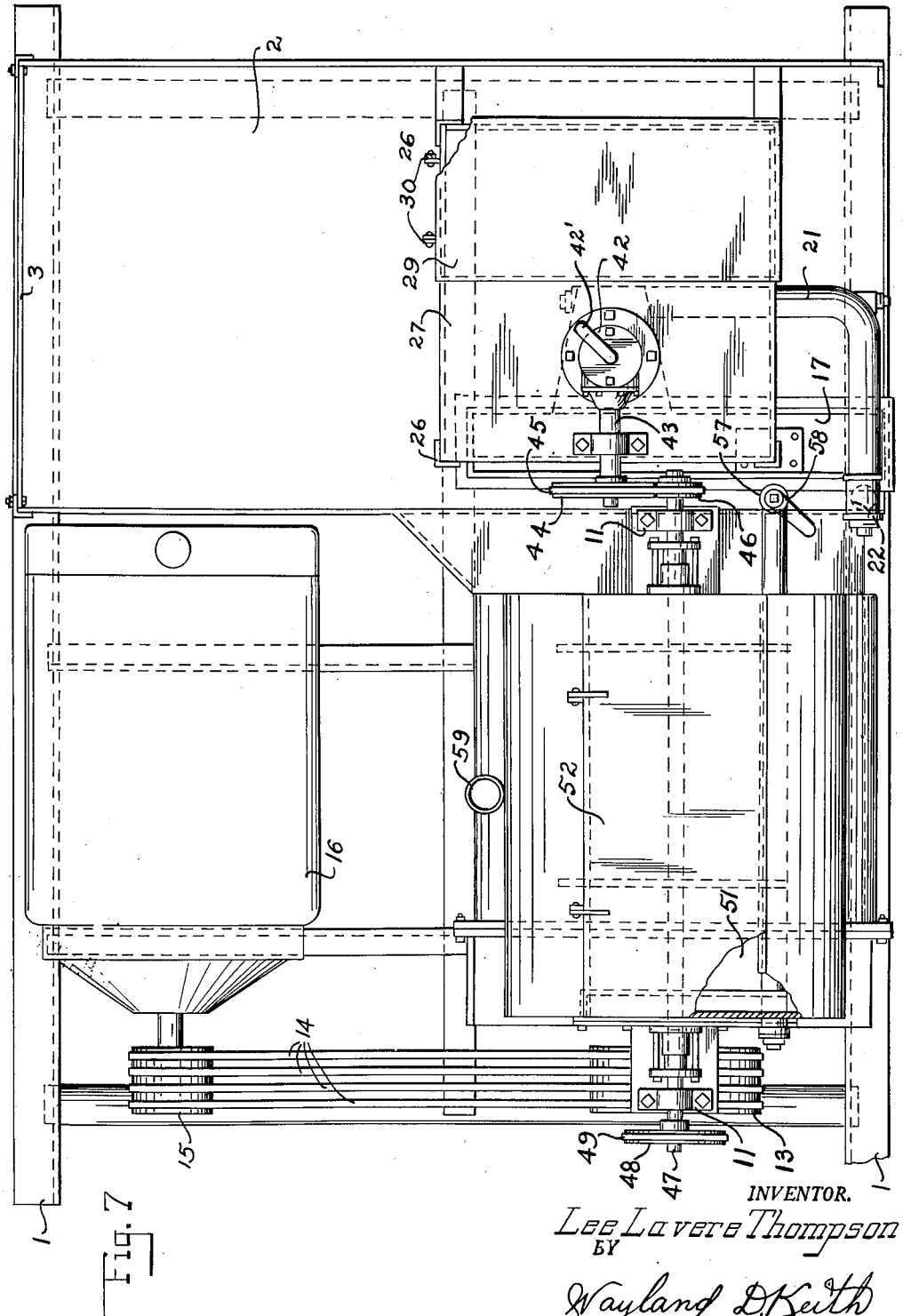

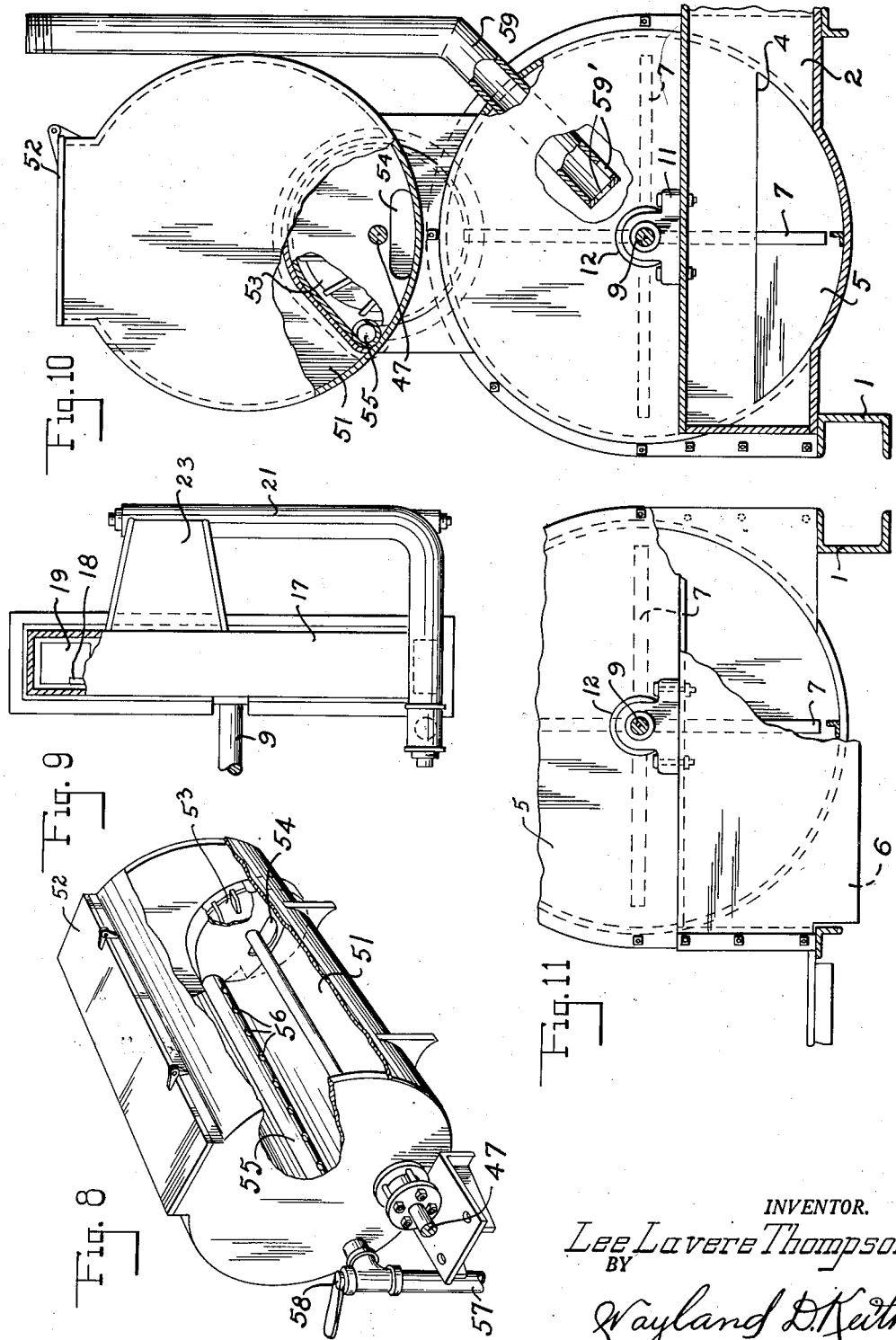

Patented Feb. 12, 1952

2,585,701

UNITED STATES PATENT OFFICE 2,585,701

MUD AND CHEMICAL MIXER

Lee Lavere Thompson, Iowa Park, Tex.

Application December 28, 1948, Serial No. 67,689

15 Claims. (Cl. 259—9)

This invention relates to improvements in mud and chemical mixers, and more particularly to mud and chemical mixers used in conditioning drilling fluid for use in drilling wells utilizing the rotary method of drilling.

Heretofore the usual practice has been to mix mud from the native formation in a slush pit, and the resulting mixture was pumped into the well as it was being drilled. The shale and rock particles were removed from this mixture as it was forced from the well by the mud circulating pumps. In certain locations, especially in sandy formation, areas in which cavernous formation exists, and in areas having high gas pressure, it is desirable, although it may not be absolutely necessary, to use a drilling fluid mixture formed of Bentonite clays and the like in order to obtain a heavy viscous mud having higher sealing qualities than could be produced ordinarily from the native formation. This drilling fluid with the higher sealing property seals the walls of the bore hole in the formation and lubricates and cools the drill bit, and washes the formation cuttings to the top of the well.

It is also desirable to utilize certain chemicals in the conditioning of mud so as to insure that the mud will perform the proper functions.

Various attempts have been made to mix mud and chemicals with the drilling fluid, both by manual methods and by mechanical methods, but those, for the most part, have not been produced in such manner as to give a drilling fluid, the various proportions and ingredients of which are proportioned scientifically to be most applicable to the formation in which it is being used, and the mixing and proportions have been left largely to chance, and have not been satisfactory.

The primary object of this invention is to provide a self contained unit in which chemicals and mud may be introduced into drilling fluid in the proper mixture without stopping the operation of the well drilling machine or creating any interruption thereof, and to deliver into the mud mixing system, the proper amount of mud conditioning materials which are thoroughly admixed with the drilling fluid during the passage of the fluid through the machine.

Another object of the invention is to provide a self contained mud mixing device that will feed the dry impalpable Bentonite clays or the like, which clays are substantially impalpable powder which must be introduced into the fluid stream in accordance with a gauged regulation.

Another object of this invention is to provide a self contained mixing device that will feed dry material into the fluid stream so as to add weight to the drilling fluid.

Another object of this invention is to provide a chemical mixing device which will mix chemicals that are heavier than the fluid with which they are mixed, and circulating the mixture in such manner that it will be held evenly in the fluid and a uniform chemical mixture is fed evenly into the drilling fluid in a fixed and predetermined proportion.

These and other objects and advantages will become more apparent as the description proceeds with reference to the accompanying drawings, in which:

Fig. 1 is a side elevation of the device with parts broken away and in section to show the details of construction;

Fig. 2 is a sectional view taken on the line 2—2 of Fig. 1;

Fig. 3 is an end elevation of the machine, with parts broken away and with parts shown in section, and showing further agitator means and the drilling fluid inlet end of the machine;

Fig. 4 is a fragmentary sectional view of the device taken on the line 4—4 in Fig. 3;

Fig. 5 is a perspective view of the agitator for the feed hopper;

Fig. 6 is a bottom plan view of the discharge orifice plate showing the bottom of the hopper in dot-dash outline;

Fig. 7 is a top plan view of the machine with parts broken away and in section to show the details of construction;

Fig. 8 is a perspective view of the chemical mixing device with parts broken away and in section to illustrate the details of construction;

Fig. 9 is a top plan view of the mud mixing pump partly in section, showing the feed pipe connected thereto;

Fig. 10 is a cross section taken on the line 10—10 of Fig. 1; with a portion broken away; and Fig. 11 is a fragmentary side elevation with parts broken away and shown in section, of the discharge end of the mud mixing chamber.

With more detailed reference to the drawings, the numeral 1 designates a frame that forms a foundation or support for the machine, and includes runners that may be provided of channels or other suitable material. These runners are provided with connecting braces in a unitary structure. All of the operating parts of the machine preferably are mounted on the frame 1 and supported thereby.

At one end of the frame 1 is a trough 2 extending transversely thereof as shown in Fig. 7. This trough 2 is adapted to receive mud flowing from a shale separator that removes the rock and shale from the drilling mud as it is discharged from the well, and to direct this mud to the mixing device forming a part of this machine. The opposite ends of the trough 2 may be provided with doors 3, one of which may be removed for connecting the trough 2 directly with the discharge side of the shale separator, or the mud and chemical mixer may be used independently of the shale separator and the drilling fluid directed into trough 2 for mixing mud-forming materials or chemicals with drilling fluid.

At one side of the trough 2 is a discharge opening 4 through which the mud is discharged into a mixing chamber, generally designated at 5, and shown particularly in Figs. 1 and 10. The mud is adapted to flow through the mixing chamber 5 and through the opposite end thereof to an outlet 6 for discharge back into the well, or to other points as desired.

The mixing chamber 5 is adapted for the thorough mixing of the mud and, if desired, to have a chemical mixed therewith in this chamber according to the embodiment of the invention as illustrated and described hereinafter. While any suitable form of mixing means may be used for the purpose, I have shown for illustration a series of radiating fingers 7 supported by a sleeve 8, which is telescoped over a shaft 9 and secured rigidly thereto in any suitable manner, as by set screws 10. The fingers 7 radiate in different directions from the periphery of the sleeve 8, as shown in Fig. 10, and will accomplish a thorough mixing of the mud in the chamber 5 as the shaft 9 is rotated.

The shaft 9 is mounted in supporting bearings 11 adjacent opposite ends of the mixing chamber 5 and preferably externally thereof, and extends through packing gland seals 12 in the end walls of the mixing chamber to prevent the leakage of mud along the shaft, preferably projecting through both opposite ends of the mixing chamber to points externally thereof.

One end of the shaft 9 is provided with a drive pulley 13 fixed thereto and connected with suitable drive means, such as a series of belts 14 passing over a pulley 15 mounted on the drive shaft of a power plant 16, such as an internal combustion engine. Any suitable or desired drive means may be utilized or means for connecting the power plant with the mixing device to form a drive therefor, the form illustrated and described being merely one embodiment of such power means which may be used if desired.

At the opposite end of the mixing chamber 5, the shaft 9 projects into a housing 17 within which an impeller 18 is mounted on the shaft for rotation thereby. This impeller 18 carries a series of blades 19, which act upon rotation of the impeller 18 to produce centrifugal pumping action in the housing 17. This housing 17 is provided with an inlet opening 20 (Fig. 3) in one side thereof open to the interior of the trough 2 to receive the mud therefrom, which is sucked into the housing 17 by the rotation of the impeller 18 therein.

The upper portion of the housing 17 is provided with a discharge pipe 21, through which the mud is discharged from the housing by the operation of the impeller 18. This pipe 21 extends to opposite sides of the housing 17 and has one branch 22 extending downwardly into the trough 2 adjacent the outlet 4 thereof, as shown in Fig. 1, so as to direct a portion of the additive mud material back into the trough 2 ahead of the opening 4.

The pipe 21 also extends in the opposite direction from the housing 17 to a chute 23, which is mounted on one side of the housing 17, as shown particularly in Figs. 3 and 4. The pipe 21 has an opening 24 along the lower side thereof at the top of the chute 23 for directing the mud downwardly through the chute and through an inlet opening 25 into the housing 17, where it is recirculated by the impeller 18 for feeding dry material from hopper 27 thereinto.

Mounted above the chute 23 on a suitable support 26 is a hopper, generally designated at 27, adapted to contain the dry mixture or clay, such as Bentonite clay, that is adapted to be mixed with liquid to produce the desired drilling mud. This hopper 27 has an opening in the top thereof provided with an upstanding surrounding rim 28 closed by a cover 29 in the form illustrated, which fits on the rim and is hinged to the hopper 27, as indicated generally at 30, so the rim and overhanging cover exclude water from finding its way into the hopper where it might interfere with the proper feeding of the dry material.

The bottom of the hopper 27 is open as indicated at 31 for feeding of the material therethrough. This opening 31 preferably is regulated by a valve 32 (see Fig. 6), which valve is made in the form of a plate journaled on a pin 33 secured to one side of the hopper 27. The valve 32 is provided with a series of openings 34 therein, preferably of graduated sizes, as shown in Fig. 6, which openings may be moved selectively into registry with the discharge opening 31 of the hopper to control or regulate the quantity of dry material fed from the hopper. Suitable indicia may be provided adjacent the respective openings, so as to indicate to the operator the selected one to be used.

Mounted in the hopper 27 is an upstanding shaft 35 suitably journaled in a sleeve 36 that extends through the major portion of the height of the hopper and covers the shaft substantially throughout its length. The shaft 35 preferably is provided with an agitator 37 on the lower end thereof directly in the discharge opening 31, which agitator may be used if desired to facilitate the flow of dry material through the discharge opening.

An additional agitator may be provided if desired within the hopper 27. I prefer to use an agitator of the character generally indicated at 38 in the form of a flat open frame pivotally mounted at 39 at its upper end on an inclined side of the hopper 27 and extending downwardly along the side of the hopper to a point immediately above the discharge opening 31. This agitator 38 has spaced arms 40 on the lower end thereof (see Fig. 2) which straddle an eccentric 41 mounted on the shaft 35, whereby the rotation of the shaft will move the arms 40 back and forth as indicated in full lines and in dotted lines in Fig. 2 to shift the agitator frame 38 transversely on the inclined side of the hopper 27. This will cause a loosening of the dry material in the hopper and the proper flow thereof downward through the discharge opening 31, as regulated by the discharge plate 32.

The shaft 35 preferably is driven by power, for which purpose it is shown as extending upward through the top of the hopper 27 where it is connected through a combination transmission and bevel gear drive, generally indicated at 42, with a transverse shaft 43. The combination transmission and bevel gear drive enables the variation of the speed of the shaft 35, thereby controlling the rate of discharge of material into the hopper 23. The shaft 43 in turn is shown as having a pulley 44 thereon connected through a belt 45 with a pulley 46 mounted on a transverse shaft 47. The combination transmission and bevel gear drive 42 is provided with a shift lever 42' to enable the selection of the desired operating speed. The shaft 47 is provided with a pulley 48 connected by a belt 49 with a pulley 50 mounted on the shaft 9 described above. This form of drive will provide for rotation of the agitator shaft 35 whenever the shaft 9 is driven by the power plant 16 to operate the agitator in the mixing chamber 5.

Provision may be made also for feeding a suitable liquid chemical compound or a colloidal chemical in liquid suspension into the mud flowing through the mixing device, as well as to mix the chemical to a desired and proper consistency for use in the mud. This may be accomplished in a mixing chamber generally indicated at 51 in Figs. 1 and 8. The mixture in the chamber 51 is kept constantly agitated by fluid discharged through openings 56. The mixing chamber 51 is provided with an opening in the top thereof provided with a cover 52 thereon over the opening, through which opening the materials may be introduced for mixing in the chamber 51.

The shaft 47 extends through the mixing chamber 51. An impeller 53 of a centrifugal pump is mounted on the shaft 47 at a suitable point in the mixing chamber 51, as at one end thereof, which pump has an inlet 54 to receive the chemical mixture or ingredients into the chamber of the pump from within the mixing chamber 51. These chemicals then are mixed and projected by the impeller 53 through a discharge pipe 55 that extends lengthwise along one side of the chamber 51, as shown in Fig. 8. The discharge pipe 55 has a series of openings 56 therein into the chamber 51 to permit a portion of the chemical mixture to be recirculated into the chamber through the pipe 55.

At its opposite end the pipe 55 is connected with a discharge pipe 57 extending downwardly into one side of the trough 2 adjacent the outlet 4, as shown in Fig. 1, to direct the remainder of the chemical mixture into the path of the mud flowing through the outlet 4 into the mixing chamber 5. The quantity of the chemical mixture may be regulated by a control valve, generally designated at 58, which may be used to shut off altogether the flow of chemical mixture into the mud, if this is desired.

The mixing chamber 5 may be provided also, if desired, with a vent pipe 59 extending upwardly therefrom, as shown in Fig. 10. This pipe 59 extends into the mixing chamber 5 into close proximity to the shaft 9 and has holes 59' on the lower end and side thereof. The agitation caused by the fingers 7 within the chamber 5 will cause a whirling action of the mud causing voids or gas space surrounding the shaft 9 which will enable the removal of the gas from the mud and from the chamber upwardly through pipe 59 which extends above the top of the machine. Proper gas detection means may be employed to detect any gas arising from the mud or additional lengths of pipe may be attached thereto for carrying off the gas arising therefrom.

The operation of the machine will be evident from the foregoing description. This machine is adapted to be used in connection with a shale separator, such as that shown in Thompson Patent No. 2,228,185 granted January 7, 1941, or the mud and chemical mixing unit may be used independently. The discharge side of the mud box of the separator is adapted to be connected with one end of the trough 2. The opposite end of this trough is closed by the door 3 so that a stream of mud will flow through at least a portion of the trough 2 and through the discharge opening 4 thereof into the mixing chamber 5.

A portion of the mud passing through the trough 2 will be drawn into the pump casing 17 through the inlet 20 by the action of the centrifugal pump impeller 18, which mud will be directed outward in two directions. One part of this mud will be discharged through the pipe 21 into the chute 23 to receive a gauged portion of the mud-mixing material from the hopper 27 through a selected opening 34 in the plate 32, by the operation of the agitator 37 upon the rotation of the shaft 35. These mixing materials may be weighting solids and the like.

The housing 17 carries a secondary inlet 25 at the lower end of the chute 23 so as to redirect the drilling fluid or mud and the dry material admixed therewith back into the centrifugal pump housing 17. The mixture of drilling fluid or mud and the dry material admixed therewith is agitated by the impeller 18 within the pump housing 17 to intimately and thoroughly wet the dry material with the fluid therein. By mixing the dry material with a relatively small amount of mud in thorough agitation, a homogeneous mixture free of lumps is produced as the mixture is recirculated within the pump housing 17.

A portion of the mixture is redirected outward through the discharge opening at the upper section of the casing 17, a part of which will be forced out through the branch opening 22 and be directed into the mud trough 2 just ahead of the opening 4, so the flow of the mud through the trough 2 into the secondary mixing chamber 5 will carry the material, such as Bentonite clay or weight-forming material which has been initially wetted, into the secondary agitation or mixing chamber 5, where the agitator fingers 7 rotating at high speed will serve to beat the mixture and thoroughly mix the wetted material with the drilling fluid flowing thereto, to form a viscous product. The mixture will be directed outward through an opening 6, either into a pit for further use as desired, or directed to the suction pipe of the mud pump to be recirculated back into the well.

While the description has been directed primarily to drilling fluid and mud, it is to be understood that any type of wetting agent, whether oil or water may be utilized, or the device may be used for mixing various other materials.

If it be desired to add a chemical thereto as used under some circumstances, such chemical can be mixed in the mixing chamber 51. The ingredients of the chemical are dumped into the chamber where they are initially mixed by the impeller 53 of the centrifugal pump, and a portion thereof is recirculated in the chamber 51 through the openings 56 in the discharge pipe 55 to agitate further the contents of the chamber and to maintain a uniform viscosity thereof. An additional portion thereof is directed from the mixing chamber, upon opening of the valve 58 to the desired extent, through the discharge pipe 57 to a point adjacent the inlet opening 4 of the mixing chamber 5. This chemical, thus initially mixed, is directed thereby into the mixing chamber 5 and is agitated therein by beater fingers 7 and more intimately mixed in this chamber with the mud flowing therethrough, so as to be dispersed uniformly through the mud as it is directed to the point of use.

In this way it is possible to proportion the ingredients, both of the mud mixture and of the chemical mixture, and to produce a thorough and uniform consistency of these ingredients ready for use. Either the chemical mixing or the mud mixing may be accomplished while utilizing the mud flowing from the well after removal of the shale and solid particles therefrom by the shale separator, whereby the mud returned to the well is of the proper and desired consistency for use. Either the mud mixer or chemical mixer may be used independently or in combination with each other and used either in conjunction with or independently of a shale separator as hereinafter described.

While the invention has been illustrated and described in one embodiment, it is recognized that variations and changes may be made therein without departing from the invention, except as specified in the claims.

I claim:

1. A mud mixer for well drilling mud comprising a mixing chamber having an inlet and an outlet, means for mixing mud in said chamber, a separate compartment for containing a dry material to be supplied to said mud, an oscillating agitator means within said separate compartment for directing said dry material out of said compartment, and means for receiving a portion of said material and producing an initial mixing thereof before directing the initially mixed material to said mixing chamber.

2. A mud mixer for drilling mud comprising a mixing chamber having an inlet and outlet for flow of the entire mud supply therethrough, a separate compartment for containing the dry material to be supplied to the mud and having angularly disposed walls, an agitator pivotally connected to a wall thereof, means for oscillating said agitator so as to direct dry material into said mud, agitating means for producing mixing action on the mud flowing through the mixing chamber, a trough connected with the inlet of the mixing chamber for directing mud thereto, a compartment adapted to contain materials for mixing with the mud, and means for producing an initial mixing of the materials and for directing the initially mixed materials into the trough adjacent the inlet of the mixing chamber.

3. A mud mixer for drilling mud comprising a mixing chamber having an inlet and outlet for flow of the entire mud supply therethrough, rotary agitator means for producing mixing action on the mud flowing through the mixing chamber, a trough connected with the inlet of the mixing chamber for directing mud thereto, a compartment adapted to contain dry materials for mixing with the mud, and further agitating means for producing an initial mixing of the materials and for directing the initially mixed materials into the trough adjacent the inlet of the mixing chamber, said means comprising a centrifugal pump having an inlet in one side thereof and a discharge pipe extending adjacent the inlet opening.

4. A mud mixer for drilling mud comprising a mixing chamber having inlet and outlet for flow of the entire mud supply therethrough, rotary agitator means for mixing the mud in the mixing chamber, a trough for directing the mud to the inlet, a hopper adapted to contain mud-forming material, means for withdrawing mud from the trough and recirculation thereof to the mixing chamber, and means for directing the mud-forming material from the hopper into said recirculated mud.

5. A mixing machine for drilling mud comprising a mixing chamber having inlet and outlet for flow of the entire mud supply therethrough, rotary agitator means for producing a mixing action on the mud flowing through the mixing chamber, a trough connected with the mixing chamber adjacent the inlet for directing mud thereto, a pump having an inlet opening in the trough to receive mud therefrom and having a discharge conduit leading from the pump and extending back to the pump for recirculating mud, and means for directing mud-forming material into said conduit.

6. A mixing machine for drilling mud comprising a mixing chamber having inlet and outlet for flow of the entire mud supply therethrough, rotary agitator means for producing a mixing action on the mud flowing through the mixing chamber, a trough connected with the mixing chamber adjacent the inlet for directing mud thereto, a pump having an inlet opening in the trough to receive mud therefrom and having a discharge conduit leading from the pump and extending back to the pump for recirculating mud, and means for directing mud-forming material into said conduit, said means comprising a chute connected with the discharge pipe and extending to the pump, and a hopper arranged over the chute for feeding mud-forming material thereto.

7. A mixing machine for drilling mud comprising a mixing chamber having inlet and outlet for flow of the entire mud supply therethrough, rotary agitator means for producing a mixing action on the mud flowing through the mixing chamber, a trough connected with the mixing chamber adjacent the inlet for directing mud thereto, a pump having an inlet opening in the trough to receive mud therefrom and having a discharge conduit leading from the pump and extending back to the pump for recirculating mud, and means for directing mud-forming material into said conduit, said means comprising a chute connected with the discharge pipe and extending to the pump, and a hopper arranged over the chute for feeding mud-forming material thereto, valve means for controlling the discharge of the material from the hopper, and means for agitating the material in the hopper for flow of said material therefrom into the chute.

8. A mixing machine for drilling mud comprising a mixing chamber having inlet and outlet for flow of the entire mud supply therethrough, rotary agitator means for producing a mixing action on the mud flowing through the mixing chamber, a trough connected with the mixing chamber adjacent the inlet for directing mud thereto, a pump having an inlet opening in the trough to receive mud therefrom and having a discharge conduit leading from the pump and extending back to the pump for recirculating mud, means for directing mud-forming material into said conduit, and a by-pass pipe connected with said discharge pipe for directing a portion of the mud from the pump to the mixing chamber.

9. A mixing machine for well drilling mud comprising a mixing chamber having an inlet and outlet for flow of the entire mud supply therethrough, rotary mixing means mounted in the chamber, a second mixing chamber mounted adjacent the first mixing chamber and adapted to contain a chemical mixture, means for withdrawing a portion of the chemical mixture from the second chamber and providing an initial mixing thereof, means for directing the initially mixed chemical from the second chamber to the first-mentioned mixing chamber, and means for recirculating a portion of the initially mixed chemical from said mixing means into the second chamber.

10. A hopper for mud-making material having an inclined wall and having a discharge opening at the lower end of the hopper, a substantially vertical shaft mounted in the hopper for rotation, an agitator frame pivotally mounted on the inclined wall of the hopper and extending downwardly toward the discharge opening and carrying a pair of outstanding fingers to embrace an eccentric means, and eccentric means connected with the shaft for swinging the agitator frame to cause an agitation of the material in the hopper and a feeding thereof through the discharge opening.

11. A mud mixer for well drilling mud comprising a mixing chamber adapted to receive mud therein, rotary agitating means in said chamber, and a vent pipe having a baffle on the inner end thereof with a hole therein and which pipe extends substantially to the axis of said rotary agitating means in said chamber to the exterior thereof for diverting gas therefrom liberated from the mud therein.

12. A mud mixer comprising a mixing chamber having an inlet, a compartment in communication with said inlet adapted to receive mud, a pump disposed to receive mud from said compartment and having an outlet in communication with said inlet, a conduit in communication with said outlet and connected with said pump for returning a portion of said mud to said pump, and means connected with said conduit for introducing a material to be supplied to said mud.

13. In a mud mixer having a mixing chamber provided with an inlet and a premixing compartment in communication with said inlet, a mixing device disposed to receive mud from said compartment, said device having an outlet in communication with said inlet, return means connected to said mixing device and said outlet for returning a portion of said mud to said mixing device, and means connected with said return means for introducing a material to be supplied to said mud.

14. In a mud mixer having a mixing chamber provided with an inlet and a premixing compartment in communication with said inlet, a mixing device disposed to receive mud from said compartment, said device having an outlet in communication with said inlet, recirculating means connected to said mixing device and said outlet for returning a portion of said mud to said mixing device, means connected with said recirculating means for introducing dry material to be supplied to said mud, and means in communication with said inlet for introducing liquid material to be supplied to said mud.

15. A mud mixer for well drilling mud comprising a mixing chamber having an inlet and outlet, means for mixing mud in said chamber, a separate compartment for containing a dry material to be supplied to the mud, an agitator means within said separate compartment for directing said dry material out of said compartment, an initial mixing chamber for receiving said material for producing an initial mixing thereof before directing the initially mixed material to said mixing chamber, and means for recirculating a portion of the mixed material for remixing with the material in said initial mixing chamber.

LEE LAVERE THOMPSON.

REFERENCES CITED

The following references are of record in the file of this patent:

UNITED STATES PATENTS

| Number | Name | Date |
| --- | --- | --- |
| 1,348,414 | Heberling | Aug. 3, 1920 |
| 1,466,639 | Browne | Aug. 28, 1923 |
| 1,584,126 | North | May 11, 1926 |
| 1,819,118 | Preleuthner | Aug. 18, 1931 |
| 2,096,174 | Hamill | Oct. 19, 1937 |
| 2,148,608 | DeStubner | Feb. 28, 1939 |
| 2,386,419 | Auer | Oct. 9, 1945 |
| 2,389,005 | Sebald | Nov. 13, 1945 |
| 2,428,411 | Davis | Oct. 7, 1947 |
| 2,447,202 | Nowery | Aug. 17, 1948 |